Feb. 25, 1964    E. B. FARNDALE    3,122,031
BORING BAR CUTTER
Filed Oct. 24, 1961    2 Sheets-Sheet 1

INVENTOR.
EDWARD B. FARNDALE
BY
Barlow & Barlow
ATTORNEYS

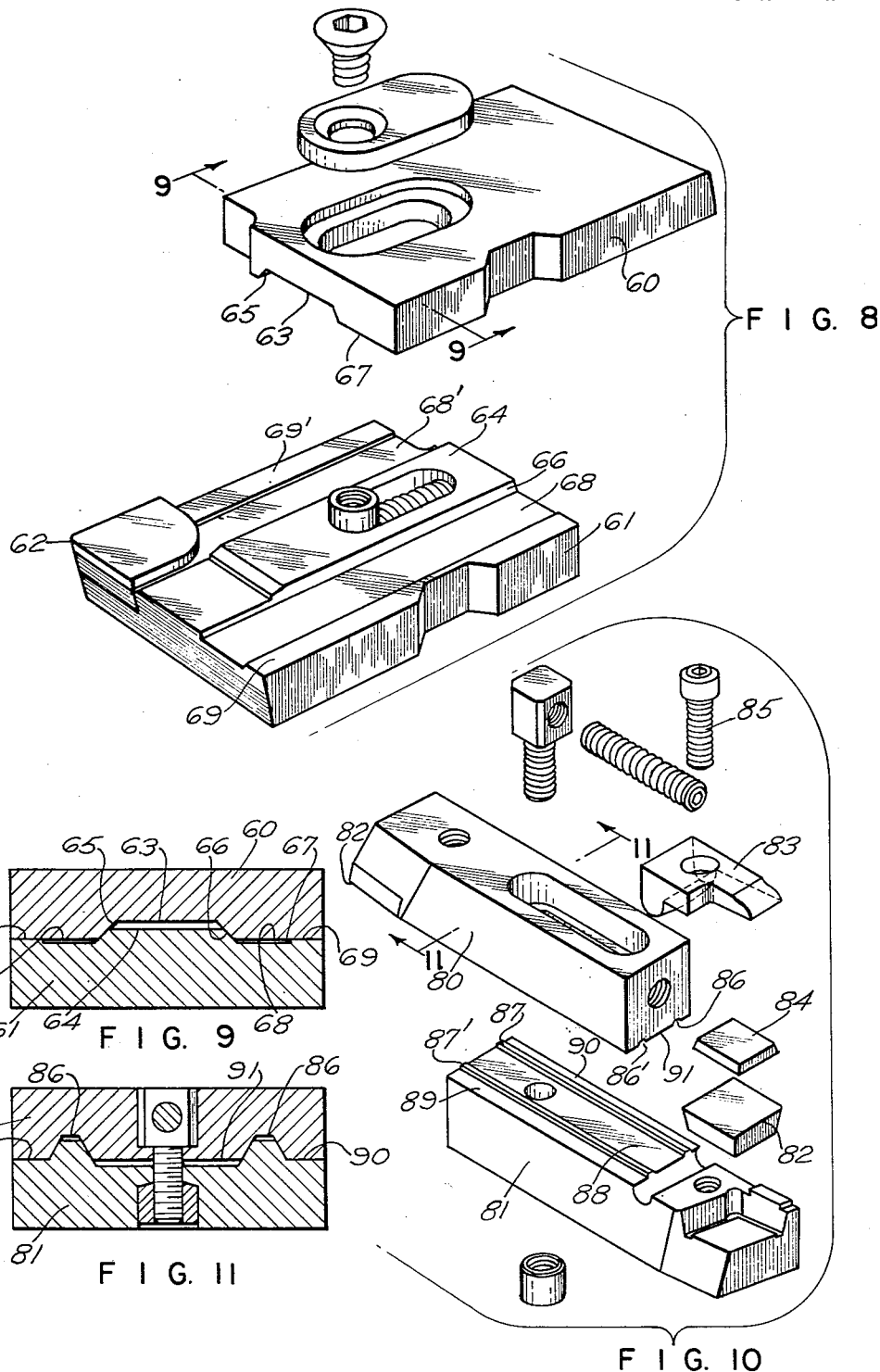

3,122,031
BORING BAR CUTTER
Edward B. Farndale, Barrington, R.I., assignor to
Madison Industries Inc., a corporation of Michigan
Filed Oct. 24, 1961, Ser. No. 147,243
7 Claims. (Cl. 77—58)

This invention relates to an improved boring bar construction and particularly the cutter assembly therefor and is a continuation-in-part of my application, Serial No. 838,623, filed September 8, 1959, now abandoned.

Basically, boring bars have assumed a standard configuration of a bar having a transverse opening to receive the cutter or cutter assembly, the cutter being suitably retained in the bar by means of a longitudinal rod which is either pressed against the cutter received within the said opening or located in a notch in the cutter to permit it to float in the bar. To enable the cutter assembly to be adjusted to compensate for wear, two complemental blades are provided which slide relatively to one to the other. In the past it has been quite common to form the complemental faces of these cutters with a keyway or guideway, this guideway being formed in such a fashion that the parallelism of the two cutter blades is attempted in two planes. A common form of such an arrangement is disclosed in the Madison Patent No. 1,118,141 and the Miller Patent No. 2,742,800. The difficulty with this type of interfitting facial relationship of the two cutting blades is that a scissoring effect is noticed widthwise of the cutter blades which is detrimental to the setup of the cutter blades themselves for it does not maintain parallelism in the two planes which is absolutely necessary. It is accordingly desirable to have a pair of cutter blades in which the two blades will be maintained in parallelism with a minimum of machining operations.

It is therefore the main object of this invention to improve generally upon the cutters for a boring bar.

Another object of the invention is to provide boring cutter blades which are prevented from having a so-called scissor action between the two blades.

A more specific object of the invention is to provide a guideway between the two blades of a bar cutter which maintains parallelism in one axis and a pair of mating flat faces which maintain parallelism in the other axis.

With these and other objects in view, the invention consists of certain novel features of construction as will be more fully described and particularly pointed out in the appended claims.

In the drawings:

FIGURE 8 is a detached perspective view of top and bottom blades of another form of cutter embodying the principles of the invention;

FIGURE 9 is a sectional view of the assembled cutter of FIG. 8 taken substantially on lines 9—9 of FIG. 8;

FIGURE 10 is a detached perspective view of the top and bottom cutters of a still further form of cutter blade embodying the principles of the invention; and FIGURE 11 is a sectional view taken on lines 11—11 of FIGURE 10 which has been placed in assembled position.

Figure 1:
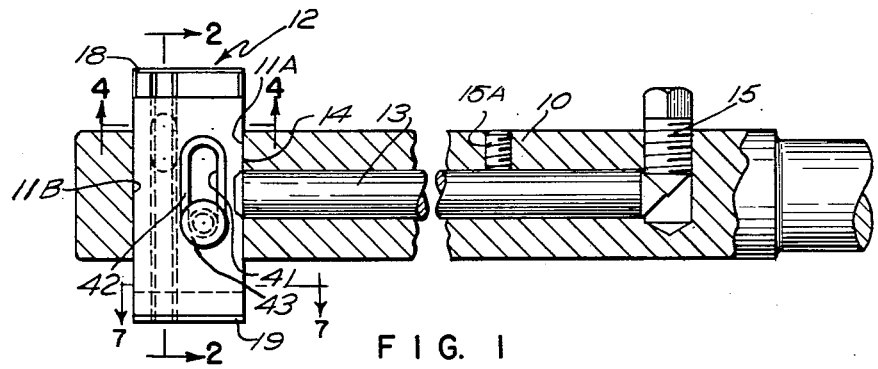
FIGURE 1 is an elevational view partly in section of an assembled boring bar with the improved cutter.

Referring now to the drawings, 10 designates a boring bar which has a transverse opening 11 to receive the cutter generally designated 12. In order to retain the cutter 12 in position, there is provided a rod 13 that is longitudinally disposed on the axis of the bar 10 in a suitable bore, the bar 13 being adapted to move along this bore. To impart movement to the rod 13, a tapered screw such as 15 acting in the tapered end of the rod may be provided in the bar 10 which forces the rod 13 toward the cutter 12. The cutters are notched as at 14 and a correspondingly shaped end of the rod 13 enters this notch. For heavy cuts the rod 13 bottoms in this notch and binds the cutter firmly in the rod, but for light reaming cuts the rod 13 does not bottom but permits movement of the cutter in the slot 11 laterally of the rod 13 so that the cutter floats and finds its own center in the work that it is operating upon. The rod 13 is bound in position by the set screw 15A. This reaming operation thus requires the surfaces 11A and 11B to be parallel and accurately at right angles to the axis of the bar 10 and also requires that the opposite edges of the cutter which engage these surfaces also be accurately parallel and so spaced that there is a sliding fit of close tolerance, the maximum total clearance being less than one thousandth of an inch.

The cutter 12 consists of two substantially equally dimensioned rectangular members 16 and 17, which for identification purposes will be designated the bottom and top blades respectively. The outer edges of these two blades are provided with cutting edges as at 18 and 19 which are slightly tapered toward the axis of the bar at their trailing edges to give some relief. To maintain the two blades 16 and 17 in alignment, there is provided a longitudinal pseudo V-shaped groove or way 20 in the blade 16 and a correspondingly pseudo V-shaped tongue 21 on the blade 17. The sides 22 of the groove 20 and the sides 23 of the tongue 21 are machined to be accurately complemental and at the same angle with respect to the faces 24 and 25 of the blades 16 and 17 respectively, and these sides are also parallel to the opposite edges 51, 52 of blade 16 and 53, 54 of blade 17 while edges 51 and 53 are in the same plane as are edges 52 and 54. To this end and purely by way of example of a typical angle, these sides 22 and 23 may be machined to an angle of from 20° to 30° with respect to a perpendicular raised from the faces 24 and 25. Additionally, the depth of the groove 20 is such as related to the height of the projection 21 that bottoming of the tongue 21 against the bottom of the groove 20 is prevented (see FIG. 7). This structure means that the blades 16 and 17 slide relative to each other only along the edges 22 and 23 which will maintain a longitudinal parallelism between the two blades.

Figure 7:
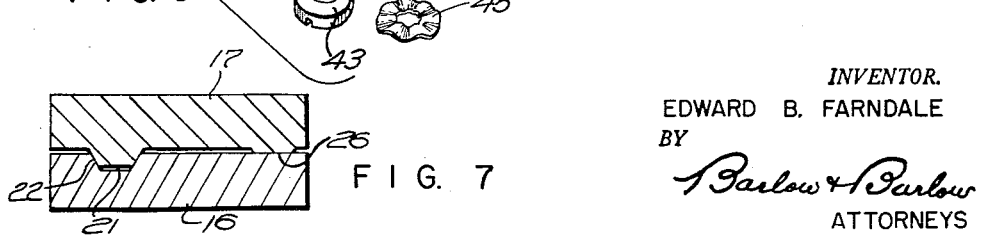
FIGURE 7 is a sectional view on a larger scale of the cutter mating surfaces on line 7—7 of FIG. 1.

To maintain parallelism of the two cutting edges 18 and 19, the surface 24 of the blade 16 is left perfectly flat and is parallel to a plane containing the edge 18. The corresponding surface 25 on the blade 17, however, is not completely planar for at one edge thereof spaced from the tongue 21 there is what might be termed a projection or rib 26 having a flat face. Referring now to FIG. 7, it will be seen that the projection or rib 26 is sufficient so that the surfaces 24 and 25 do not really touch. Thus, in combination with the tongue 21 resting in the way 20 and the frictional engagement of the rib surface 26 with the surface 24 we find that these are the only points of contact to resist frictional sliding between the two blades. From a manufacturing standpoint the difference in level between the surface of rib 26 and surface 25 is on the order of five-thousandths of an inch (.005″) and the machining between this particular projection 26 and the tongue 21 is made such that parallelism will be achieved between the two cutting edges 18 and 19, which from a production standpoint are actually accomplished after the machining operations of the two mating surfaces just described.

Figures 2, 3, 4:
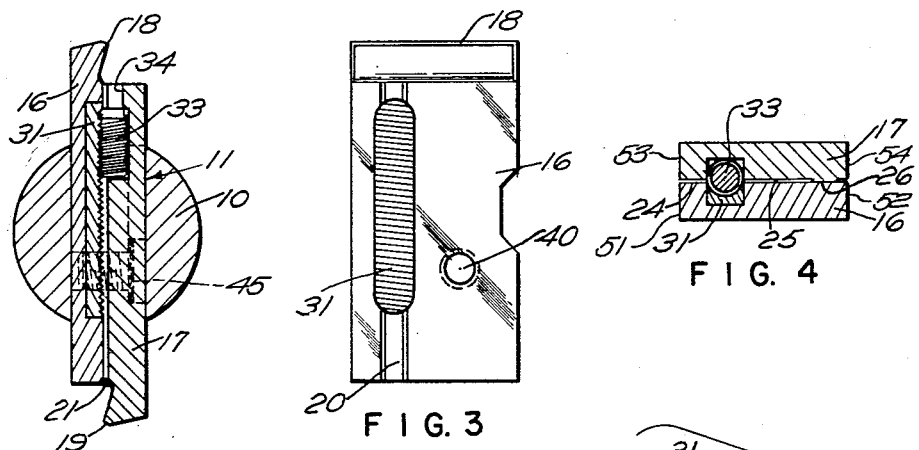
FIGURE 2 is a sectional view taken on lines 2—2 of FIG. 1.
FIGURE 3 is a plan view of the bottom blade of the cutter.
FIGURE 4 is a sectional view taken on lines 4—4 of FIG. 1.
Figures 5, 6:
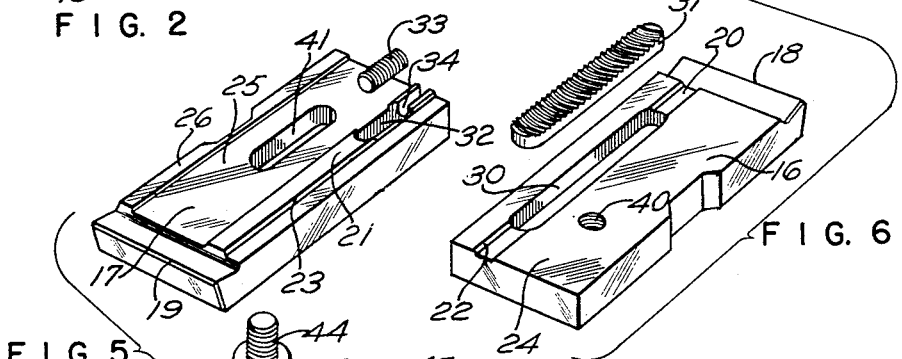
FIGURES 5 and 6 are detached perspective views of the top and bottom blades of the cutter.

In order to permit the two cutting edges to be adjusted relative to each other to compensate for wear, a recess 30 is cut in the blade 16 in line with the way 20 and within this recess 30, there is received a threaded insert 31. In the mating blade 17 a similar recess 32 is formed in line with the tongue 21 and received within this recess 32 is an adjusting screw 33 having complemental threads to the threaded insert 31. Additionally an access hole to the head of the screw 33 as at 34 is formed, and thus when the blades are in mating relationship as shown better in FIG. 2, it will be seen that the rotation of screw 33 which is held within the recess 32 against longitudinal movement will cause relative movement of the blades 16 and 17. In order to hold the two blades 16 and 17 in adjusted position, a threaded hole 40 is provided in the blade 16 and in longitudinal alignment with this hole 40 is a slot 41 in the blade 17 which is counterbored as at 42. This arrangement permits the reception of the flat head 43 of a screw 44 within the counterbored section, the screw 44 being received through the slot 41 and into the threaded bore 40. A washer 45 is located beneath the head 43 and is of a type to provide spring loading of the screw so that some adustment of the screw 33 may be had while the parts are still frictionally resiliently held together.

Referring now to FIGS. 8 and 9 of the drawings, there is shown a modified form of cutting blade which embodies the same features as that previously described. Here there is disclosed a reaming cutter consisting of two substantially equally dimensioned rectangular blades 60 and 61 which are provided with cutting edges such as at 62. To maintain the blades in alignment, there is provided a longitudinal pseudo V-shaped groove or way 63 in blade 60 and a correspondingly pseudo V-shaped tongue 64 on the blade 61. The sides 65 of the recess 63 and the sides 66 on the tongue 64 are machined to be accurately complemental and at the same angle, these sides being maintained parallel to the edges of the cutter blades 60 and 61. Also the height of the tongue 64 is such as related to the depth of the groove 63 that bottoming is prevented, the only sliding fit being had along the angle sides 65 and 66. To further maintain parallelism of the two cutting blades 60 and 61, the surfaces 67 of the blade 60 are left perfectly flat while the complemental surface of the blade 61 is provided with a pair of recesses as at 68 and 68′ and ribs as at 69 and 69′. As will be seen by referring to FIG. 9, the only frictional engagement between the two cutter blades 60 and 61 is had between the flats provided at surfaces 69, 69′ operating against the surface 67 together with the frictional engagement of the surfaces 65 and 66. Thus, there is merely a V and flat engagement which permits smooth, accurate adjustment between the two blades.

A still further modification of this principle is shown in FIGS. 10 and 11 in another roughing cutter consisting of two substantially equally dimensioned blade members 80 and 81. The outer edges of these two blades are provided with cutting edges as at 82 which in the instant embodiment are removable cutter blades held in a suitable manner on the blade body 80 and 81 by a clamp 83 and chip breaker 84 through the medium of a clamping screw 85. To maintain the two blades 80 and 81 in alignment, the blade 80 is provided with a pair of longitudinal V-shaped grooves or ways 86, 86′ and a pair of pseudo V-shaped tongues 87 and 87′ formed on the blade 81. The sides of the grooves 86, 86′ and the sides of the tongues 87, 87′ are machined to be accurately complemental and at the same angle as well as being parallel to the edges of the blades 80 and 81. Additionally, the depth of the grooves 86 and 86′ is such that bottoming of the tongues 87, 87′ is prevented and further the surface 88 on the blade 81 is machined deeper than the rib surfaces 89, 90 on the outer edges of the tongues 87, 87′ so that a relief is had in between the two tongues 87, 87′. To further maintain parallelism of the cutting edges and the blades themselves, the surface 91 of the blade 80 is left perfectly flat, and as will be seen in FIG. 11 has engagement with the surfaces 89 and 90 of the blade 81. Accordingly, the engagement between the two blades is had on the V-ways and the surfaces 89 and 90. This type of construction prevents the cutters from scissoring in operation and permits smooth, accurate adjustment of the mating parts which slide on precision ground V's and flats.

It will be seen, therefore, that a simple cutter has been disclosed which may be readily machined and will yield the advantage of a minimal frictional contact between the parts as a result of the V-way together with accurate parallelism of the two cutting edges.

I claim:

1. A cutter assembly for a boring bar comprising a pair of blades having substantial overlapping portions, a first blade having a flat face in a single plane presented to the overlapping portion of the second blade and at least one groove therein, the groove in the first blade having a flat bottom wall with the opposite sides thereof extending upwardly at an obtuse angle to said wall, the second blade having at least one rib with a face in a single plane to engage the face of the first blade, and at least one tongue in the second blade having a complemental shape to the groove, the sides of the tongue engaging the sides of said groove.

2. A cutter assembly as in claim 1 wherein two grooves are formed in the first blade and two tongues are formed in the second blade having a complemental shape to said grooves.

3. A boring cutter as in claim 1 wherein said sides of said tongues and groove extend on planes parallel to the correspondingly extending peripheral edges of both of said blades.

4. A boring cutter as in claim 1 wherein the groove and the tongue are located centrally of said first and second blades and including an adjusting means located in said tongue, said adjusting means comprising a recess in the tongue having a rotatable screw confined therein, a nut means carried by the first blade, said screw moving said nut coupled with said screw carried by the first blade.

5. A boring cutter as in claim 1 wherein adjusting means are located partially in said tongue and partially in said groove comprising a recess in said tongue having a rotatable screw confined therein, and said groove carrying threads to move said first blade upon rotation of said screw.

6. A boring cutter as in claim 1 wherein adjusting means are located partially in said tongue and partially in said groove comprising a recess in said tongue having a rotatable screw confined therein and said groove having a recess and a threaded member located in said recess with which said screw engages to move said first blade upon rotation of said screw.

7. A cutter assembly as in claim 1 with means to bind said blades together against relative movement.

References Cited in the file of this patent
UNITED STATES PATENTS
2,742,800    Miller _____ Apr. 24, 1956
FOREIGN PATENTS
810,913    Germany _____ Aug. 16, 1951